UNITED STATES PATENT OFFICE.

LUTHER C. RHEA, OF COLUMBUS, OHIO.

BOILER.

971,561.

Specification of Letters Patent.   Patented Oct. 4, 1910.

Application filed August 2, 1910.   Serial No. 575,125.

*To all whom it may concern:*

Be it known that I, LUTHER C. RHEA, a citizen of the United States, residing at Columbus, in the county of Franklin and State of Ohio, have invented certain new and useful Improvements in Boilers, of which the following is a specification.

My invention relates to that class of water-heaters usually employing a gas-flame as the source of heat.

The objects sought to be attained by my invention are several in number, including the production and maintenance of constant circulation of water through the heater, the provision of a maximum amount of heating surface for the gas-flame, and generally a construction which will raise the temperature of the water more quickly than has heretofore been accomplished with such devices, which will do so at a minimum amount of applied heat.

An important object of this invention is to provide a device of the above character having a structure which is light, cheap, durable and thoroughly efficient in fulfilling its function.

A further object of this invention is to provide a heater of the above character, comprising inner and outer casings having different thicknesses, so that in case the pressure within the heater should rise above the safety limit, the inner casing will be caved in and the flame of the burner will be extinguished.

A further object of this invention is to provide a heater of the above character, comprising inner and outer substantially spherical casings, and a burner disposed within the inner casing capable of producing a flame having a spherical shape to conform to the shape of the interior of the inner casing.

A further object of this invention is to provide a device of the above character, formed of few and simple parts, which may be easily separated from each other, for the purpose of cleaning or repairing the same.

Other objects and advantages of this invention will appear during the course of the following description.

Figure 1:
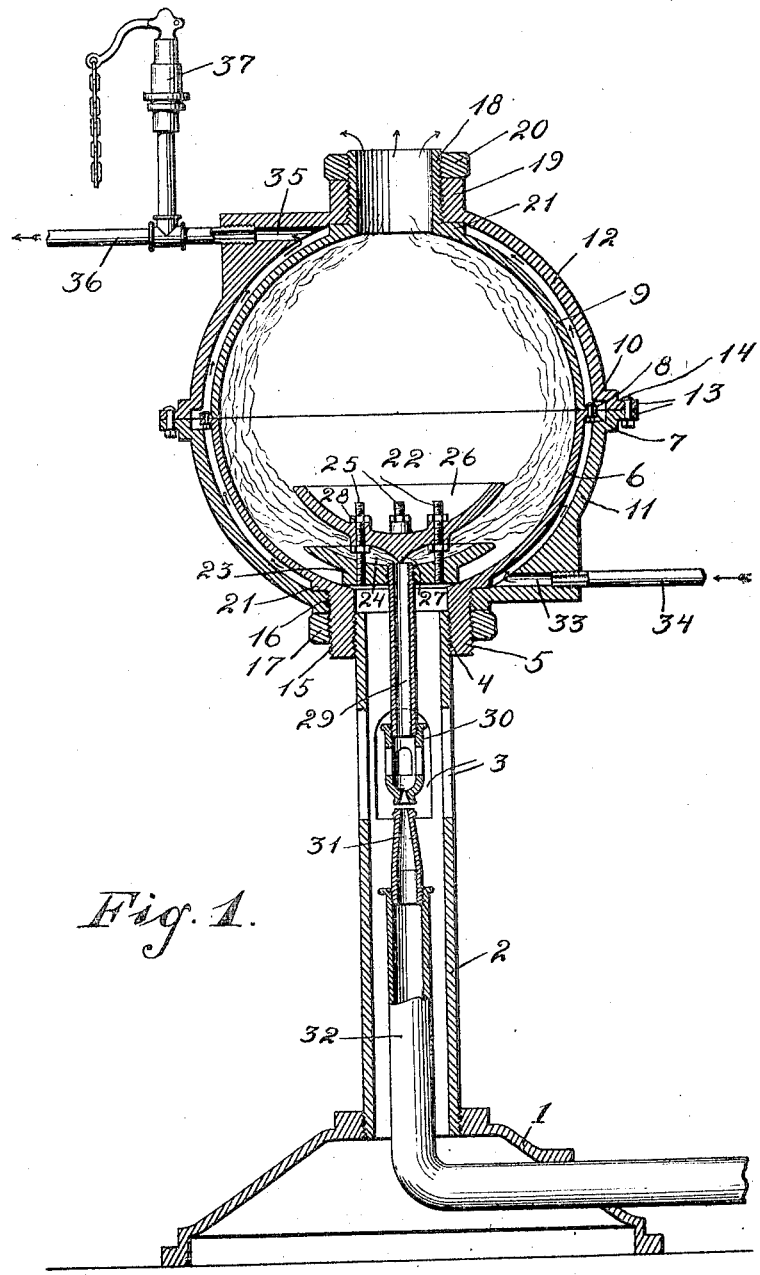
Figure 2:
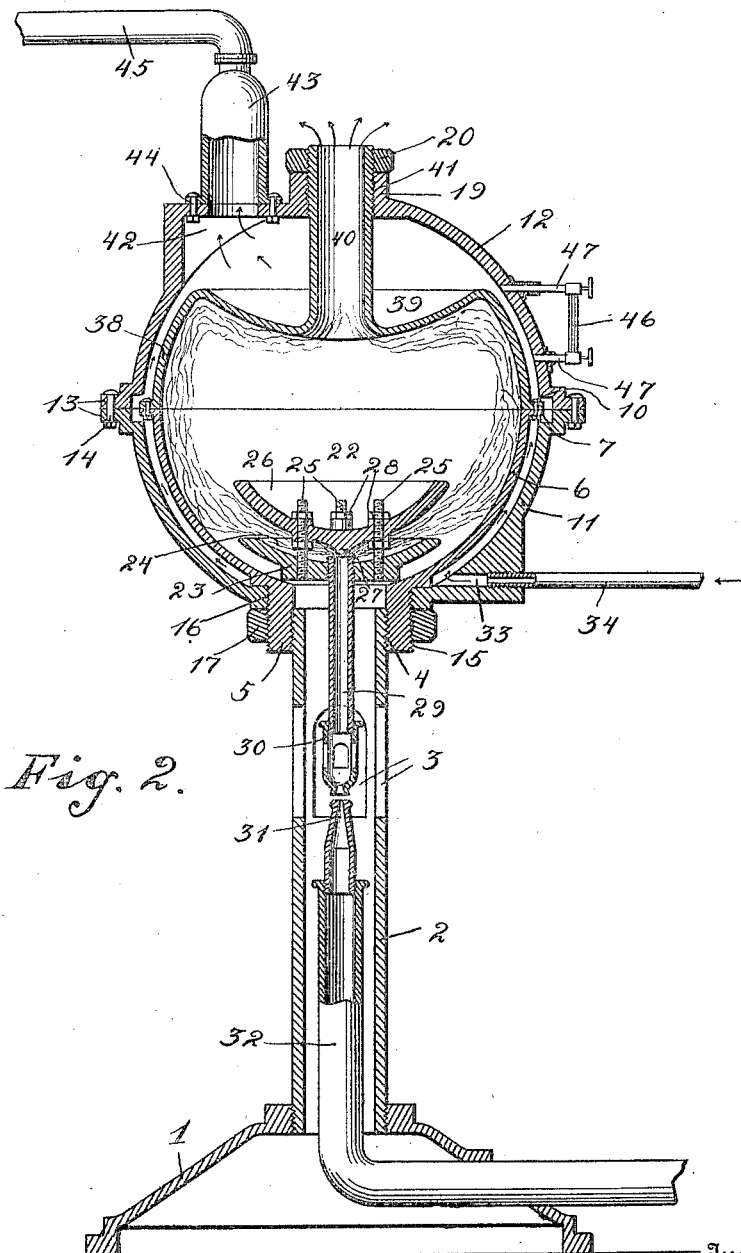

In the drawings forming a part of this specification, and in which like numerals are employed to designate like parts throughout the same, Figure 1 is a central vertical section through the device employed as a water-heater, and Fig. 2 is a similar view through a slightly modified form of device employed as a steam generator.

The description of the parts of the device shown in Fig. 1, would also serve as a description for the greater portion of the parts of the device shown in Fig. 2, and the same numerals will be applied to like parts in Figs. 1 and 2.

In the drawings, wherein is illustrated a preferred embodiment of my invention, the numeral 1 designates a suitable base upon which is mounted a tubular upright 2, provided near its center with openings 3 formed therethrough. The upper end of this upright is externally screw threaded, as shown at 4, for engagement with an internally screw threaded tubular boss 5 formed upon the lower portion of a substantially hemispherical section 6. The upper edge of this hemispherical section is provided with an outwardly extending annular flange 7, for engagement with a corresponding flange 8 carried by an upper hemispherical section 9. The sections 6 and 9 are removably secured together by means of bolts 10, which engage the annular flanges 7 and 8, as shown. It is to be understood that suitable packing may be placed between the flanges 7 and 8, to effect a tight joint. The hemispherical sections 6 and 9 coöperate to form an inner spherical casing for the device. This inner spherical casing is jacketed or surrounded by an outer spherical casing formed of hemispherical sections 11 and 12, having their adjacent edges provided with outwardly extending annular flanges 13, which are removably secured together by bolts 14. The inner hollow spherical casing is arranged concentric with relation to the outer spherical casing so as to provide a thin continuous water receiving chamber of spherical form between said casings. The boss 5 is externally screw threaded, as shown at 15, for engagement with the screw threaded wall 16 of an opening formed through the hemispherical section 11. A clamping nut 17 is provided for engagement with the boss 5 to securely hold the sections 6 and 11 in their proper positions with relation to each other, The hemispherical section 9 is provided near its upper portion with a tubular boss 18, which is externally screw threaded for engagement with an internally screw threaded boss 19 formed upon the upper portion of the hemispherical section 12. The tubular boss 18 carries a clamping nut 20 for engagement with the boss 19. The inner and outer casings are retained in their proper spaced concentric positions, by means of annular flanges 21 formed upon the sections 6 and 9, as shown.

Special attention is called to the fact that the walls of the inner spherical casing are much thinner than the walls of the outer spherical casing, whereby should the pressure in the water receiving chamber exceed the safety limit, the inner casing would be caved in, the flame of the burner to be described, extinguished, and the least amount of damage done by such an explosion.

Arranged within the lower portion of the inner spherical casing, is a gas-burner 22, comprising a lower plate 23 having its upper surface concaved, as shown at 24. This plate is supported, as shown, by the boss 5 and carries screw threaded pins 25. Upon these pins is mounted a deflector 26, the lower wall of which has substantially the same curvature as the interior of the inner casing. The lower wall terminates in a point 27. The deflector 26 is secured in its proper position upon pins 25, by means of nuts 28, as shown. The burner 22 is provided with a pipe 29 passing through the central portion of the plate 23, and extending downwardly within the tubular upright 2, for engagement with an air and gas mixer 30. Gas is supplied to the air and gas mixer from a nipple 31 having communication with a supply pipe 32.

Special attention is called to the fact that the burner 22 produces a flame which is substantially spherical and therefore conforms to the curvature of and directly engages the greater portion of the inner casing. The section 11 is provided with an opening 33 having communication with the water receiving chamber and also with a water supply pipe 34.

In the form of my device as illustrated in Fig. 1, the section 12 is provided with a discharge opening 35 having communication with the upper portion of the water receiving chamber and a discharge pipe 36. This discharge pipe may preferably have suitable communication with a safety valve 37.

In the form of the device, as shown in Fig. 2, the upper inner section 9, shown in Fig. 1, is dispensed with, and a section 38 is employed in connection with the section 6 for forming the inner casing. It is to be understood that the walls of this inner casing are much thinner than the walls of the outer casing, for the purpose specified in connection with the device illustrated in Fig. 1. The section 38 has the upper portion of its material bent downwardly, as shown, for forming a concave portion 39 for holding the water fed into the water receiving chamber. The section 38 is provided with a tubular portion 40, externally screw threaded, as shown at 41, for suitable engagement with the tubular boss 19 and clamping nut 20. The section 12 of the outer casing, is provided with an opening 42 having communication with a dome 43, which receives the dry steam from the heater. This dome has a steam tight joint with the section 12 and is secured thereto, as shown at 44. A discharge pipe 45 has communication with the upper end of the dome 43, for conducting steam from the same. A water tube-gage 46 has communication with the water receiving chamber, by means of pipes 47, as shown. This gage enables the operator to ascertain the level of the water within the device illustrated in Fig. 2.

In the operation of the water-heater as illustrated in Fig. 1, the fuel is supplied to the burner and such fuel is ignited forming a substantially spherical flame, as shown. The cold water is then supplied to the lower portion of the water receiving chamber, through the pipe 34, and as this water is heated it rises upwardly and is discharged through the pipe 36. It is obvious that the temperature of the water discharged from the pipe 36 may be regulated according to the amount of heat supplied at the burner.

In the operation of the steam generator, as illustrated in Fig. 2, the water is supplied into the water receiving chamber, through the pipe 34, and fills the pocket formed by the concave portion 39. It is to be understood that any desired means (not shown) may be employed to regulate the amount of water fed through the pipe 34. The flame from the burner is approximately spherical and directly engages the interior of the inner casing and the bottom wall of the portion 39, as shown. The steam generated passes into the dome 43 and is conducted therefrom through the pipe 45.

I have found that particularly good results can be obtained by connecting the water-heater, as illustrated in Fig. 1, in series with the steam generator, as illustrated in Fig. 2, so that the hot water discharged from the water-heater will be fed into the lower portion of the steam generator. However, it is to be understood that I do not restrict myself to this use of the water-heater and steam generator, connected in series, as either may be successfully operated alone.

I wish it understood that the form of my invention herewith shown and described, is to be taken as a preferred example of the same, and that certain changes in the shape, size and arrangement of parts may be resorted to without departing from the spirit of my invention or the scope of the subjoined claims.

Having thus fully described my invention what I claim as new and desire to secure by Letters Patent, is:—

1. In a device of the character described, outer and inner substantially spherical casings for forming a water receiving chamber therebetween, a burner arranged within the lower portion of the inner casing, comprising a deflector having a lower side of substantially the same curvature as said inner casing, for forming a substantially spherical flame, and the wall of the inner casing being formed much thinner than the wall of the outer casing.

2. In a device of the character described, outer and inner approximately spherical casings forming a water receiving chamber therebetween, the inner casing having the upper portion of its material bent to form a pocket for holding water and having communication with said water receiving chamber, a gas burner arranged within said inner casing, and the wall of the inner casing being formed much thinner than the wall of the outer casing.

3. In a device of the character described, outer and inner substantially spherical casings for forming a water receiving chamber therebetween, the wall of the inner casing being formed much thinner than the wall of the outer casing, and a burner disposed within the inner casing.

4. In a device of the character described, outer and inner substantially spherical casings for forming a water receiving chamber therebetween, and a burner arranged in the lower portion of the inner casing adapted to provide a flame which is substantially spherical.

5. In a device of the character described, outer and inner substantially spherical casings for forming a thin spherical water receiving chamber therebetween, a burner arranged within the lower portion of the inner casing and comprising a deflector having a lower side of substantially the same curvature as said inner casing, whereby a flame may be formed which is substantially spherical and directly engages the inner surface of said inner casing.

6. In a device of the character described, outer and inner concentrically substantially spherical casings for forming a thin spherical water receiving chamber therebetween, a gas burner disposed within the lower portion of said inner casing, said gas burner comprising a lower concaved plate and a deflector having its lower side convexed, means to supply water to the lower portion of said water receiving chamber, and discharge means having communication with the upper portion of said water receiving chamber.

7. In a device of the character described, outer and inner substantially spherical casings for forming a water receiving chamber therebetween, the outer and inner casings being formed of separable substantially semi-spherical sections, and a gas burner disposed within the inner casing.

8. In a device of the character described, outer and inner approximately spherical casings for forming a water receiving chamber therebetween, the inner casing having the upper portion of its material bent downwardly to form a pocket having communication with said water receiving chamber, and a gas burner arranged within said inner casing.

9. In a device of the character described, outer and inner concentrically arranged approximately spherical casings to form a water receiving chamber therebetween, the inner casing having the upper portion of its material bent downwardly to form a water-holding pocket having communication with said water receiving chamber, said inner and outer casings being formed of separable sections, and a gas burner arranged within the inner casing.

In testimony whereof I affix my signature in presence of two witnesses.

LUTHER C. RHEA.

Witnesses:
B. P. FISHBURNE,
FLAVES T. SLAGLE.